United States Patent [19]

Michael et al.

[11] 3,971,063

[45] July 20, 1976

[54] DIGITAL TIME BASE CORRECTOR OSCILLATORS

[75] Inventors: Peter Colin Michael; Anthony Donald Stalley, both of Newbury, England

[73] Assignee: Quantel Limited, England

[22] Filed: Mar. 13, 1975

[21] Appl. No.: 558,090

[30] Foreign Application Priority Data
Mar. 16, 1974 United Kingdom............... 11793/74

[52] U.S. Cl.................................. 358/8; 360/36; 331/20
[51] Int. Cl.²........................................ H04N 5/76
[58] Field of Search.............. 358/8, 4, 19, 20, 21; 178/69.5 TV, 6.6 TC, DIG. 3; 331/20; 360/36

[56] References Cited
UNITED STATES PATENTS

| | | | |
|---|---|---|---|
| 3,428,745 | 2/1969 | Coleman, Jr. et al. ................ | 358/8 |
| 3,749,836 | 7/1973 | Hayami et al. ............... | 178/69.5 TV |
| 3,752,912 | 8/1973 | Ohsawa et al. ................ | 178/DIG. 3 |
| 3,763,317 | 10/1973 | Coleman, Jr. et al. ................ | 358/8 |
| 3,860,952 | 1/1975 | Tallent et al. ........................... | 358/8 |

Primary Examiner—Robert L. Griffin
Assistant Examiner—Jin F. Ng
Attorney, Agent, or Firm—Dowell & Dowell

[57] ABSTRACT

The television digital time base corrector for television equipment comprises an analogue to digital converter for receiving a video analogue signal, a store for receiving the successive line information in digital form from the output of the analogue to digital converter, a digital to analogue converter for receiving the stored signal, a read/write control circuit for writing the digital information into the store, an input oscillator for determining the rate of conversion of the analogue signal and the rate of writing into the store and output oscillator for controlling the rate of reading out of the digital information from the store and the rate of conversion of the digital information in the store. The input oscillator is in the form of a triggered oscillator which is switched on and off in time relationship with the video sync pulse and/or sub-carrier color burst, the period of switching on and off and the frequency of the oscillator being dependent upon the duration of the lines. Thus the length of the train of sampling clock pulses is varied in sympathy with the off-tape line period by changing the frequency of the clock pulses from line to line.

4 Claims, 3 Drawing Figures

DIGITAL TIME BASE CORRECTOR OSCILLATORS

BACKGROUND OF THE INVENTION

This invention relates to a digital time base corrector. The purpose of this equipment is to accept the output from a video tape recorder (VTR) and to correct for errors in timing of the output signal with reference to a stable synchronizing signal.

The incoming video signal is converted into a digital format by analogue to digital converter (ADC). The digital output from the ADC is stored in a store which will conveniently have a capacity sufficient to store one or more complete television lines. The output from the store is converted into an analogue video signal by a digital to analogue converter (DAC).

The incoming video signal will be converted into a digital format at a clock rate determined by the input oscillator. The input oscillator will be caused to follow the timing perturbations of the output signal of the VTR. Such perturbations are caused by changes in the velocity of the tape transport and the scanning mechanism of the VTR.

The information read from the store into the DAC is under the control of an output oscillator which is generally locked to a local synchronizing signal.

The principle of the operation is that the information is written into the store at a speed which depends upon the perturbations on the output from the VTR but that the information is read out of the store at a constant rate. Thus the equipment eliminates time perturbations occurring on a video signal.

This particular invention relates to the improvements in the input oscillator which may be made in such a system. Generally the above configuration is known and recognised by engineers versed in the art of television systems. The improvements relate in particular to the method by which the input oscillator is caused to follow the perturbations on the video tape recorder output.

In a known configuration an oscillator design to track the information coming from the video tape recorder may take the form of a phase locked loop (PLL). The information coming from the video tape recorder contains synchronizing pulse information and colour sub-carrier information which corresponds to the standard television format. At the beginning of each line a synchronizing pulse is provided so that the commencement of the line is accurately known.

When the format is associated with a colour television system such as the PAL or NTSC systems, a colour sub-carrier burst is provided in addition to the synchronizing pulse.

The burst is typically ten cycles at colour sub-carrier frequency. This burst of sub-carrier occurring just after the synchronizing pulse on each television line is an indication of the reference phase which allows the colour information contained in the following picture period of the video waveform to be accurately decoded into its component parts.

A conventional input oscillator system for the digital time base corrector needs to provide a source of clock pulses capable of driving the ADC and store at a rate which is derived from the frequency of the synchronizing pulses and colour subcarrier information. During the course of one television line a digital time base corrector may take several hundred samples along the line. The method by which these sampling pulses may be generated is in a phase locked loop.

A voltage controlled oscillator (VCO) running at a suitable sampling frequency produces an output which is used to drive the ADC. The output is also applied to a system of multipliers and dividers which reduces the frequency to precisely that of the television line frequency. The output of the system is applied to one input of a phase discriminator which has its other input coming from the separated line synchronising pulses from the VTR.

The phase discriminator will produce a variable voltage at its output which is so arranged to control the frequency of the voltage controlled oscillator in a manner which will cause the phase error at the two inputs to the discriminator to be close to zero.

The above system is known and recognised by users of digital television equipment and represents only a description of one method currently being used. The disadvantage of such known equipment is that the instantaneous frequency of the VCO is a function of the output of the phase discriminator over several preceding lines. Therefore when a phase error between the off-tape signal and the VCO occurs, there is a finite response time before the error can be reduced to zero. For some types of off-tape timing perturbations it is impossible to design a phase locked loop which satisfactorily tracks the off-tape signal (that is to a close enough timing accuracy).

One method of overcoming the disadvantages of the known arrangement is provided by the invention described in the copending U.S. patent application Ser. No. 558,091 filed on the Mar. 13, 1975 by A. D. Stalley and J. A. Coffey filed concurrently herewith in which use is made of a triggered oscillator which is switched on in timed relationship with the video sync pulse and/or sub-carrier colour burst.

However, whilst the triggered oscillator operating in the mode described with reference to FIG. 3 or FIG. 5 in the specification of copending application referred to above, provides an accurate starting point for the input oscillator at the beginning of each line, it does not provide any correction for the change in frequency which may occur from one line to the next since this oscillator has a fixed frequency of oscillation.

The effect of velocity errors in the VTR is to cause an effective change of television line length which may be a small fraction of a $\mu$second. The change of line length gives rise to an effective change of colour rendition as the line scans from the left hand side of the screen to the right hand side of the screen.

SUMMARY OF THE INVENTION

According to the present invention we provide a digital time base corrector for television equipment comprising an analogue to digital converter for receiving a video analogue signal, a store for receiving the successive line information in digital form from the output of the analogue to digital converter, a digital to analogue converter for receiving the stored signal, means for writing the digital information into said store, an input oscillator for determining the rate of conversion of said analogue signal and the rate of writing into said store, and an output oscillator for controlling the rate of reading out of the digital information from said store and the rate of conversion of the digital information in said store, said input oscillator being switched on and off in time relationship with the video sync pulse and/or sub-carrier colour burst, the period of switching on and off and the frequency of the oscillator being dependant upon the duration of the lines.

The oscillator may comprise a crystal, a resonance circuit or a delay line and components which enable the frequency to be slightly variable by the application of a variable voltage at its input.

As in said copending application, the oscillator is caused to trigger at the beginning of each television line by a signal which is derived from the synchronizing pulse information and/or the colour sub-carrier burst information. Triggering is controlled by the synchronizing pulse information alone in one example, or by both the synchronizing pulse information and the colour burst information in another example, these examples being described in the copending application referred to above. The oscillator commences its pulse generation at a time which is directly related to the timing of the synchronizing pulse or colour burst information coming from the VTR. The oscillator produces a train of pulses sufficient to cause all the video information to be converted by the ADC and stored and then stops awaiting the arrival of the next start pulse.

Figure 1:
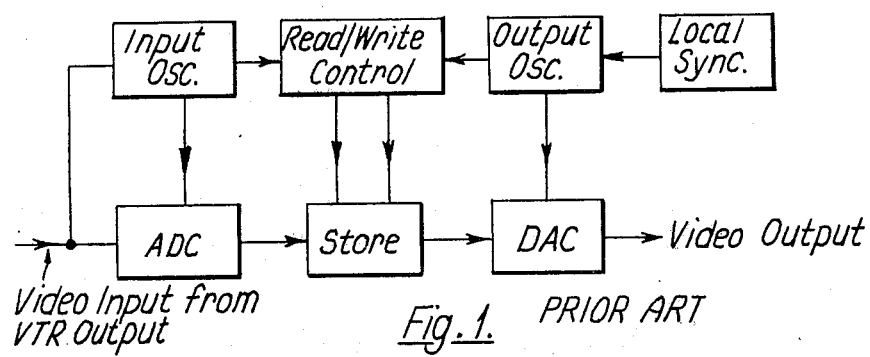
FIG. 1 is a block circuit diagram of the known digital time base corrector.
Figure 2:
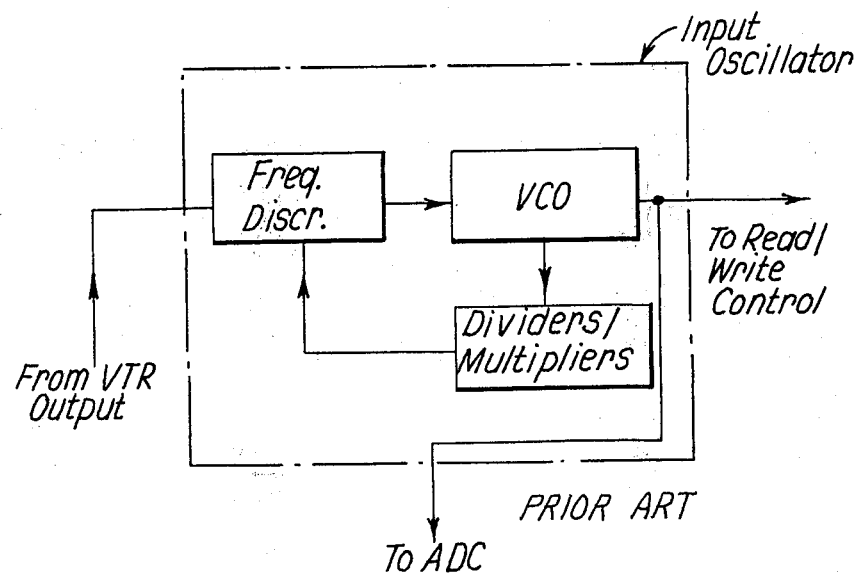
FIG. 2 shows a known input oscillator using the phase locked loop system.

The general arrangement of the digital time base corrector common to the known system and present invention is shown in FIG. 1. The input oscillator used in the known corrector is shown in FIG. 2 and consists of the phase locked loop comprising the voltage controlled oscillator and the frequency discriminator referred to above.

Figure 3:
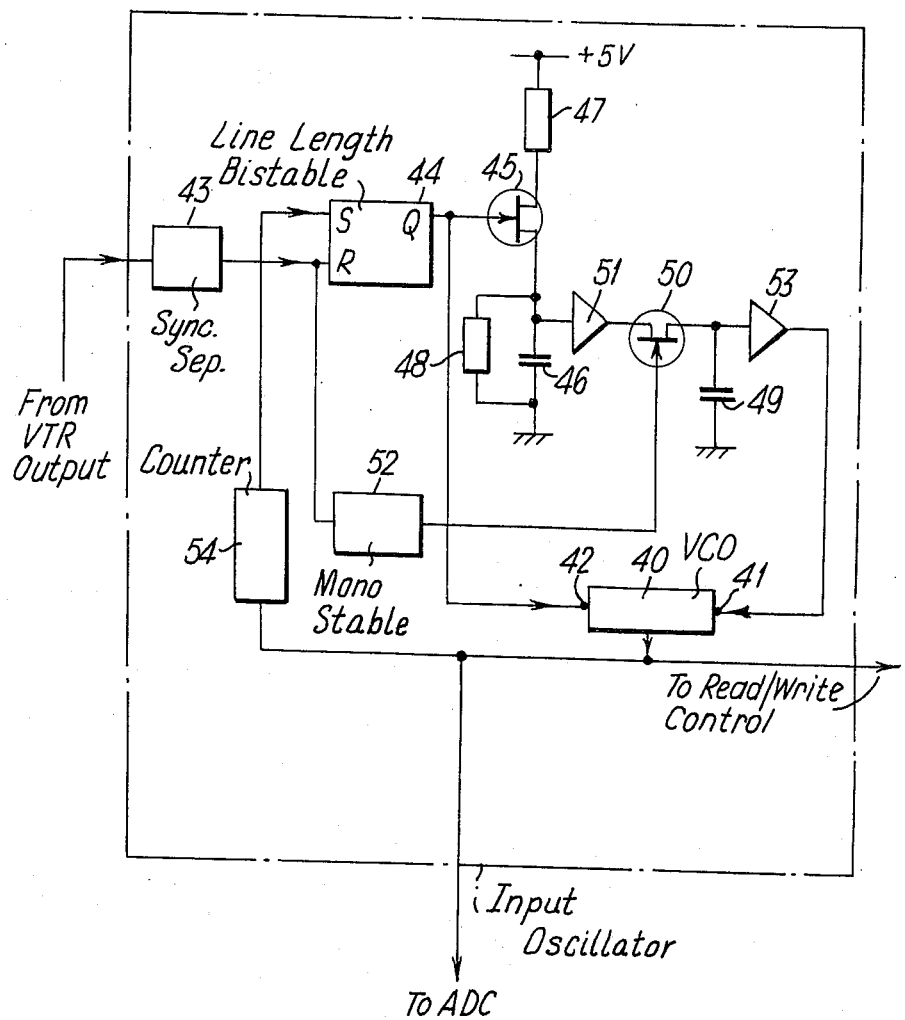
FIG. 3 shows a schematic circuit diagram of an input oscillator modifying the time base corrector in accordance with the present invention, in which the frequency thereof can be measured on a line to line basis, and altered to compensate for velocity errors.

Whereas in the triggered oscillator described above in relation to FIG. 3 or FIG. 5 of said copending application, the beginning of the line is precisely timed and thus the colour rendition at the beginning of a line is accurate, the circuit of FIG. 3 allows the colour rendition at the end of the line to be more accurately maintained.

DESCRIPTION OF PREFERRED EMBODIMENT

In this modification the length of each line produced by the VTR is measured and the resultant output is used to adjust the oscillator frequency for the next line so that it is closer to the desired frequency.

The incoming video information from the VTR contains a synchronizing pulse as used in the standard television video format. An oscillator start pulse in this instance is derived from the leading edge of the synchronizing pulse but may be combined with information contained in the colour sub-carrier burst to improve the timing stability of the oscillator start point (see FIG. 5 of the copending application referred to above). The time is compared between the moment at which the oscillator stopped and the moment at which the next start pulse is derived. The resultant information is used to control the oscillator frequency so that the time variance is minimised. The oscillator stop point is determined by a counter which counts a predetermined number of oscillator pulses and then stops the input oscillator.

The oscillator output pulses are generated by a triggered voltage controlled oscillator 40 which is a stable LC oscillator but in which the frequency may be adjusted slightly by the application of a variable voltage at a voltage control input terminal 41. The triggered oscillator 40 starts upon receiving a logical low level at its stop-start control terminal 42 and stops upon receiving a logical high level at its stop-start control terminal 42.

The pulses derived from a sync pulse separator 43 (or from the more accurate circuit of FIG. 5 of said copending application) are used to control a line length bistable 44 which also produces the stop-start waveform from the triggered voltge controlled oscillator 40.

The output from the line length bistable 44 produces a pulse which is used to control a switch (FET) 45 to switch a current into a capacitor 46 for the period between stopping and restarting the oscillator for a new line. The current derived from a +5v rail and a resistor 47 flows into the capacitor 46 charging it to a voltage which is dependent upon the width of the pulse driving the switch 45.

A resistor 48 is arranged to discharge capacitor 46 during the length of each line, said capacitor being charged from zero to a voltage which represents the difference between the stop and start time during the interval between stopping and starting the oscillator (see TD2 FIG. 4 of said copending application).

An analogue sampling circuit including a switch (FET) 50, connected to said capacitor 46 by a buffer amplifier 51, and a monostable 52, is arranged to sample the peak of the voltage on capacitor 46 and store in a capacitor 49 so that the resultant output from a buffer amplifier 53 is a steady voltage for the length of one line and used to drive the voltage control input terminal 41 of the triggered VCO 40. The sampling pulse driving the sampling switch is derived from the oscillator start pulse. In a typical practical circuit the sampling pulse generator monostable 52 will have a pulse width of approximately 1 $\mu$ sec following the oscillator start pulse. This 1 $\mu$sec pulse will close the sampling switch just as the capacitor 46 reaches its peak voltage and will charge capacitor 49 to that peak voltage. At the end of the 1 $\mu$sec period the sampling switch will open leaving the charge stored on capacitor 49 which is available as a buffered signal to control the oscillator.

A counter 54 is connected between the output of the VCO 40 and the set input of the bistable 44 for providing the stop pulse after the correct count has been made. The moment of occurrence of the stop pulse varies in dependance upon the oscillator frequency and the number of counted pulses. Whilst the oscillation frequency may vary from line to line, the number of pulses will, of course, remain constant for each line as determined by the counter. Thus the length of the train of sampling clock pulses is varied in sympathy with the off-tape line period by changing the frequency of the clock pulses from line to line.

We claim:

1. A digital time base corrector for television equipment comprising:
   a. an analogue to digital converter for receiving successive lines of an analogue video signal having horizontal sync pulse information thereon and for converting said signal into digital form, b. a store for receiving the video information in digital form from the output of the analogue to digital converter, c. control means for writing in and reading out the digital information in said store, d. a digital to analogue converter for receiving the stored signal read out from said store, e. a voltage controlled input oscillator for determining the rate of conversion of said analogue signal into digital form and the rate of writing in of said digital information into said store, f. a fixed frequency output oscillator for determining the rate of reading out of the digital information from said store and the rate of conversion of the digial information into analogue form, g. said input oscillator including a triggered oscillator having an input connected to said incoming video signal which triggered oscillator is triggered into oscillation in timed relationship with the incoming horizontal sync pulse information and, including means connected to said triggered oscillator for switching off said triggered oscillator after emission of a predetermined number of oscillations therefrom which are sufficient to cause all the video information in one line to be converted into digital form and stored, and control voltage means operating to develop a voltage which is dependent on the time interval between the switching off of the triggered oscillator after the predetermined number of oscillations and the start of said oscillator on receipt of the sync pulse information at the start of the next line, said triggered oscillator being coupled to said control voltage means to have its frequency varied according to the level of said developed voltage.

2. A digital time base corrector according to claim 1, wherein said control voltage means includes a first capacitor which is charged during the interval occuring between the stop and start of the triggered oscillator to a level depending upon the duration of the time interval, sampling means for sampling the charge during or after said interval and a second capacitor connected to said sampling means for holding said sampled charge and connected to the voltage control input of said oscillator to provide a control voltage of constant level during one line.

3. A digital time base corrector according to claim 2, wherein said first capacitor is switched by a transistor controlled by a bistable which bistable receives stop and start pulses respectively from a counter coupled with the oscillator output and a sync pulse separator receiving the incoming video information.

4. A digital time base corrector according to claim 3, wherein the sampling means comprises a transistor controlled by a monostable connected to said sync pulse separator.

* * * * *